(12) United States Patent
Miller et al.

(10) Patent No.: US 9,479,696 B1
(45) Date of Patent: Oct. 25, 2016

(54) POST-CAPTURE SELECTION OF MEDIA TYPE

(71) Applicant: Facebook, Inc., Menlo Park, CA (US)

(72) Inventors: Joshua Alexander Miller, London (GB); Leo Litterello Mancini, Middle Village, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/748,734

(22) Filed: Jun. 24, 2015

(51) Int. Cl.
*H04N 5/232* (2006.01)
*H04L 29/08* (2006.01)
*G06F 3/0482* (2013.01)
*G06F 3/0484* (2013.01)
*G06F 3/0488* (2013.01)
*G06F 3/0354* (2013.01)
*G06F 3/01* (2006.01)
*G06F 3/0346* (2013.01)
*H04N 1/64* (2006.01)

(52) U.S. Cl.
CPC .......... *H04N 5/23229* (2013.01); *G06F 3/017* (2013.01); *G06F 3/0346* (2013.01); *G06F 3/03545* (2013.01); *G06F 3/0482* (2013.01); *G06F 3/04842* (2013.01); *G06F 3/04883* (2013.01); *H04L 67/306* (2013.01); *H04N 1/642* (2013.01); *H04N 5/23216* (2013.01); *H04N 5/23293* (2013.01); *G06T 2207/30201* (2013.01)

(58) Field of Classification Search
CPC ... H04N 5/23229; H04N 5/76; H04N 1/2125
See application file for complete search history.

(56) References Cited

U.S. PATENT DOCUMENTS

| | | | |
|---|---|---|---|
| 7,987,492 B2 * | 7/2011 | Liwerant | H04M 3/567 725/105 |
| 2008/0013916 A1 * | 1/2008 | Sharpe | G11B 27/034 386/278 |
| 2008/0307475 A1 * | 12/2008 | Liwerant | H04M 3/567 725/109 |
| 2009/0005071 A1 * | 1/2009 | Forstall | G06F 3/0481 455/456.1 |
| 2011/0249144 A1 * | 10/2011 | Chang | G06F 17/30259 348/231.3 |
| 2012/0100895 A1 * | 4/2012 | Priyantha | H04W 52/0293 455/574 |
| 2014/0108550 A1 * | 4/2014 | Rubinstein | G06Q 10/107 709/204 |
| 2014/0369627 A1 * | 12/2014 | Huang | G06T 5/50 382/309 |
| 2015/0116541 A1 * | 4/2015 | Gilman | H04N 1/2112 348/231.5 |
| 2015/0178322 A1 * | 6/2015 | Smietanka | G06F 17/30268 707/772 |

* cited by examiner

*Primary Examiner* — James Hannett
(74) *Attorney, Agent, or Firm* — Baker Botts L.L.P.

(57) ABSTRACT

In one embodiment, a method includes receiving a user input, the user input representing a request to begin capturing a multimedia content item. The method also includes, in response to the user input, initiating the capturing of the multimedia content item. The method also includes, after the capturing is complete, presenting a plurality of media types to select from. The method further includes receiving a selection of one of the media types. The method also includes, in response to the received selection, encoding one or more portions of the captured multimedia content item in accordance with the media-type selection to produce a corresponding encoded media object.

51 Claims, 7 Drawing Sheets

POST-CAPTURE SELECTION OF MEDIA TYPE

TECHNICAL FIELD

This disclosure generally relates to capturing multimedia content.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device (e.g., a smartphone) may allow a user to capture a multimedia content item and then, after capture is complete, review the multimedia content item, and then select a media type for the multimedia content item. A user may initiate capture of the multimedia content item by providing a user input to a computing device (e.g., a touch input or a particular motion of the device), and the device may automatically begin capturing the multimedia content item in response to receiving the user input. With a post-capture selection process, a user may not specify whether they want to capture a video, an image, a GIF, or any other suitable media type until after the capture is completed. The user may perform a media-type selection after the multimedia content has been captured, and the user need not select a media type prior to capturing the content. As an example and not by way of limitation, in response to a request to capture multimedia content, a computing device may capture a video, and after the capture is complete, the device may display a post-capture selection screen where the user may select a media type (e.g., video, photo, or GIF) for export. If a user selects a photo media type, the user may scroll through frames of the captured video to select one or more frames to be extracted as still images. If a user selects a video or GIF media type, the user may identify a portion or excerpt of the captured video to be extracted as a video or as a GIF animation. An encoding process may then be performed to produce an encoded media object from a selected portion of the captured content where the encoded media object has the media type selected by the user. The encoded media object may be uploaded or shared via a social-networking system.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
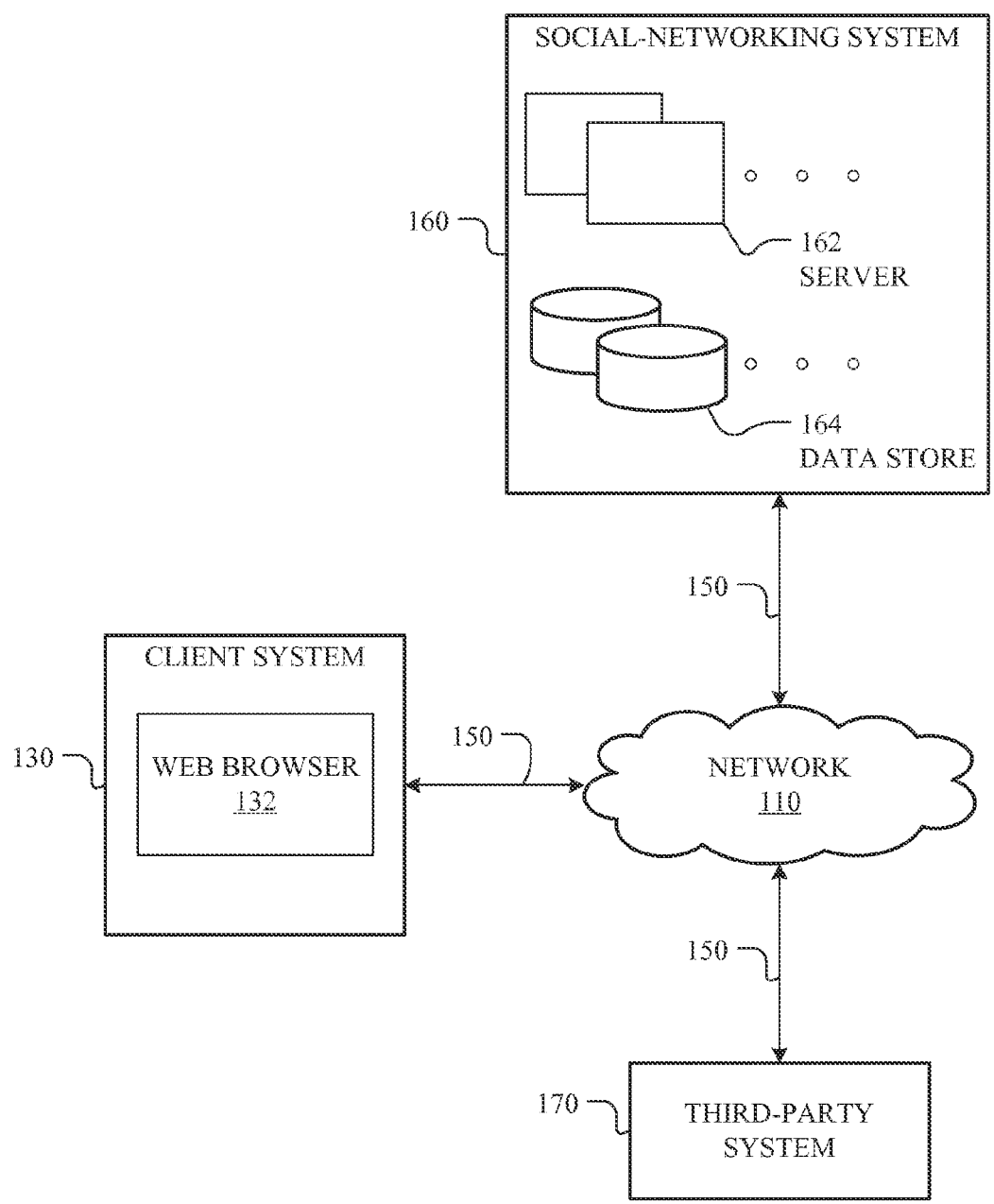
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, a Global Positioning System (GPS) device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
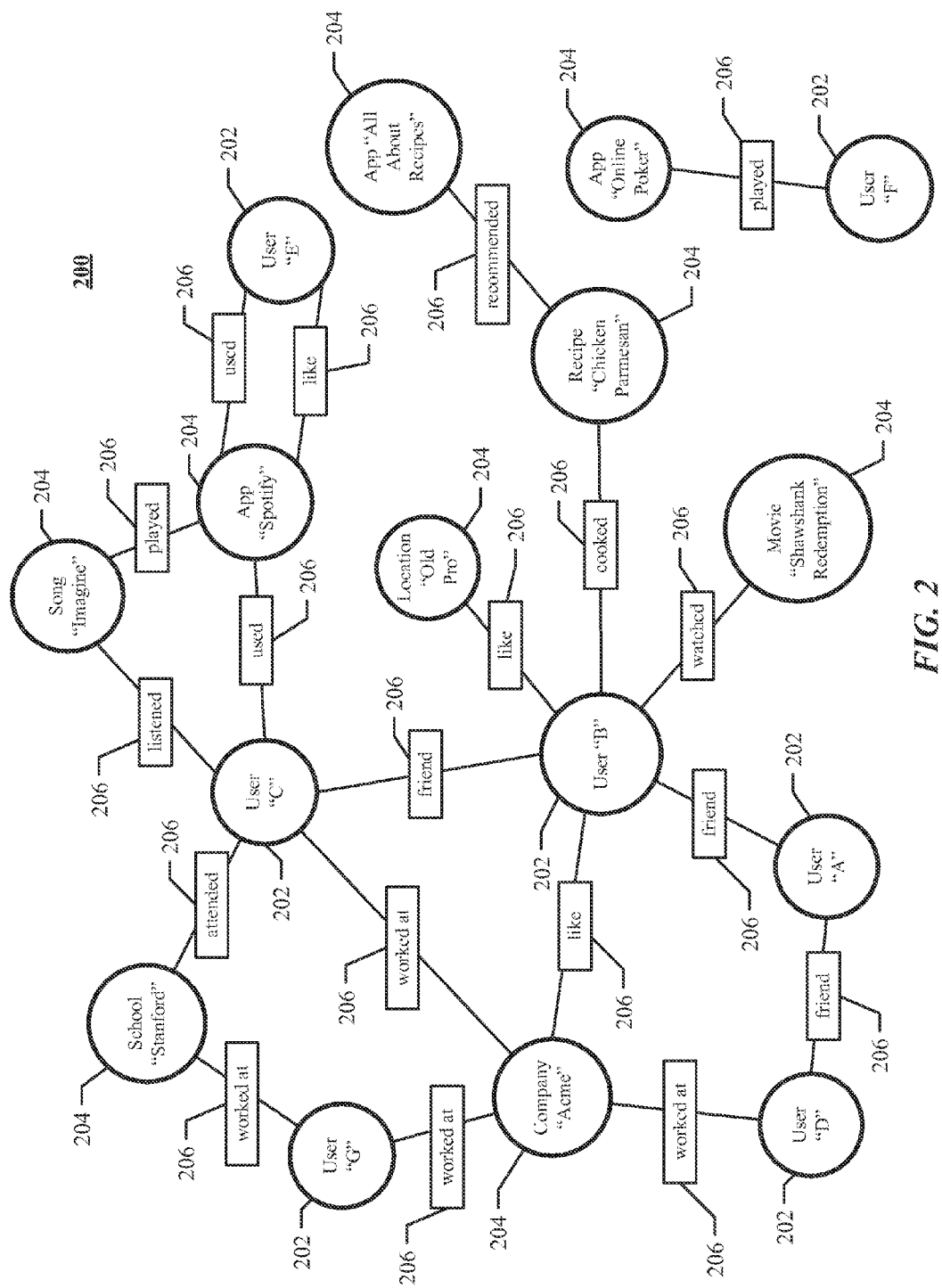
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 3:
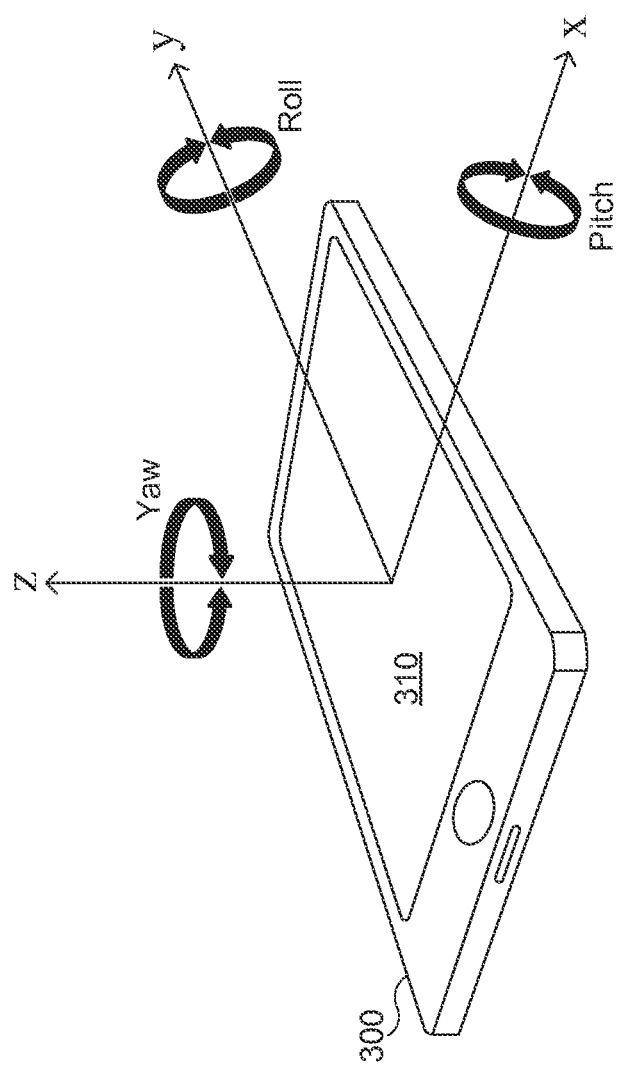
FIG. 3 illustrates an example handheld computing device.

FIG. 3 illustrates example handheld computing device 300. In particular embodiments, handheld computing device 300 may refer to a mobile device, smartphone, tablet computer, digital camera, personal digital assistant (PDA), portable media player, a combination of two or more of these, or any other suitable device. In particular embodiments, computing device 300 may include a display screen 310, camera, microphone, touch sensor, motion sensor, any other suitable component, or any combination thereof. Although this disclosure describes and illustrates particular computing devices that include particular components, this disclosure contemplates any suitable computing devices that include any suitable components.

In particular embodiments, computing device 300 may include one or more integrated cameras or an interface to one or more external cameras. As an example and not by way of limitation, computing device 300 may include a camera for capturing multimedia content. In particular embodiments, capturing multimedia content may refer to a process of obtaining or recording images or video from a camera. In particular embodiments, computing device 300 may include a microphone for capturing sound or audio input (e.g., music, a person's voice, or ambient sound). In particular embodiments, capturing multimedia content may refer to a process of obtaining or recording sound from a microphone. As an example and not by way of limitation, when capturing multimedia content, computing device 300 may record video from a camera while also recording audio input from a microphone. Although this disclosure describes and illustrates particular devices configured to capture particular multimedia content, this disclosure contemplates any suitable devices configured to capture any suitable multimedia content.

In particular embodiments, computing device 300 may include one or more digital cameras, where a digital camera may refer to a device that records, captures, or stores images or videos in a digital format. Herein, the term "camera" may refer to a digital camera, and the term "video" or "digital video" may refer to a video recorded, captured, or stored in a digital format. In particular embodiments, a camera may include an image sensor, such as for example a charge-coupled device (CCD) image sensor or a complementary metal-oxide-semiconductor (CMOS) active-pixel sensor. In particular embodiments, computing device 300 may include display screen 310 for viewing a live scene from a camera (e.g., prior to capturing or while capturing multimedia content) as well as for viewing captured multimedia content. As an example and not by way of limitation, computing device 300 may include a liquid-crystal display (LCD), a light-emitting diode (LED) display, an organic LED (OLED) display, or any other suitable display.

In particular embodiments, computing device 300 may include a touch sensor that may detect a presence or location of a touch or an object (e.g., a user's finger or a stylus) located near or in contact with a surface of the touch sensor. In particular embodiments, screen 310 may be a touch screen that includes a display and a touch sensor, where the touch sensor allows a user to interact with device 300 or what is displayed on touch screen 310 using a stylus or the user's finger. As an example and not by way of limitation, touch screen 310 may include a substantially transparent touch-sensor layer overlaid on or located in front of a display. In particular embodiments, information from a touch sensor of device 300 may be used to determine that a user is requesting the capture of a multimedia content item. Similarly, information from a touch sensor may be used to determine that a user is requesting the termination of capturing a multimedia content item. As an example and not by way of limitation, a first tap applied to a touch sensor of device 300 may indicate a request to begin capturing multimedia content, and a subsequent second tap may indicate a request to terminate the capture.

In particular embodiments, a touch sensor of computing device 300 may be configured to receive or detect any suitable touch input, touch gesture, multi-touch gesture, or any suitable combination thereof. As an example and not by way of limitation, a touch sensor of computing device 300 may be configured to detect a tap (e.g., a user briefly touches a surface of the touch sensor), a double tap (e.g., two taps in succession), a press (e.g., a touch that lasts for a particular duration of time, such as for example, for 0.5 seconds or longer), a scroll or pan (e.g., sliding a finger up, down, or sideways across a touch-sensor surface), a swipe (e.g., a sideways swiping motion), a pinch (e.g., thumb and forefinger move towards one another), a zoom (e.g., thumb and forefinger move apart), a touch-input pattern (e.g., a particular series of motions of a finger across a touch-sensor surface), or any other suitable touch gesture.

In particular embodiments, computing device 300 may include a motion sensor that senses or detects position, orientation, or translational or rotational movement of device 300. As an example and not by way of limitation, a motion sensor of device 300 may be configured to sense rotational or translational displacement, velocity, or acceleration, or any suitable combination thereof. As illustrated in the example of FIG. 3, translational movement of device 300 may include a motion along the x-axis, y-axis, or z-axis, or along any suitable combination of these axes. Additionally, rotational movement of device 300 may include a roll, pitch, or yaw motion, or any suitable combination of such rotations, where a roll motion corresponds to rotation about the y-axis, a pitch motion corresponds to rotation about the x-axis, and a yaw motion corresponds to a rotation about the z-axis.

In particular embodiments, device 300 may include an accelerometer, gyroscope, magnetometer, any other suitable motion sensor, or any suitable combination thereof. As an example and not by way of limitation, device 300 may be a smartphone that includes a camera, touch screen 310, and a gyroscope sensor. In particular embodiments, a motion sensor integrated with a device 300 may include a vibrating-structure gyroscope manufactured with micro-electro-mechanical systems (MEMS) technology. In particular embodiments, a gyroscope may be used to determine rotational orientation or motion (e.g., roll, pitch, or yaw motion) versus time of device 300. In particular embodiments, a gyroscope may be a rate gyroscope that determines rotational (or angular) velocity of device 300. As an example and not by way of limitation, a rate gyroscope may provide data, information, or values that correspond to angular velocity of device 300 in units of radians/s or degrees/s. In particular embodiments, a magnetometer (e.g., a magnetic field sensor) may be used to measure orientation or rotational movement of device 300. A magnetometer may sense the earth's magnetic field or any other suitable, substantially static magnetic field to determine an angular orientation of device 300. In particular embodiments, an accelerometer may be used to determine a translational or rotational movement of device 300. As an example and not by way of limitation, accelerometer sensor data may be used to determine a linear acceleration of device 300 along any of axes x, y, or z illustrated in FIG. 3. Moreover, integrating accelerometer data over a particular time interval may be used to determine a velocity of device 300, and performing a second integration operation may allow determination of a position of device 300 as a function of time. Although this disclosure describes particular devices having particular sensors for detecting particular motions, this disclosure contemplates any suitable devices having any suitable sensors for detecting any suitable motions.

In particular embodiments, a movement of device 300 may be determined by information or values received from one or more motion sensors (e.g., gyroscope, magnetometer, or accelerometer) integrated with device 300. As an example and not by way of limitation, information from a gyroscope may be used to determine that the orientation of device 300 has changed from a horizontal orientation to a vertical orientation. Device 300 may be lying flat on a surface, or a user may be holding device 300 in their hand in a substantially horizontal orientation. Then, the user may pick up or point device 300 to take a picture or record a video, and a gyroscope signal may be used to determine that the orientation of device 300 has changed from its original orientation to a substantially orthogonal orientation (e.g., orientation of device 300 has changed by approximately 90 degrees with respect to its original orientation). As another example and not by way of limitation, information from an accelerometer may be used to determine that device 300 has undergone a flick-type motion where a user holding device 300 in their hand may "flick" device 300 by moving their hand or wrist in a rapid or jolting motion resulting in a corresponding flicking motion of device 300. A user may grasp a near end of device 300 in their hand, and a flicking motion may result in the far end of device 300 experiencing most of the flicking action. In particular embodiments, a forward or vertical flicking motion of device 300 may include a displacement, velocity, or acceleration substantially along the z-axis (e.g., perpendicular to a surface of display screen 310) or a pitching rotational displacement, velocity, or acceleration about the x-axis. Additionally, such a forward flicking motion may be accompanied by a relatively small amount of one or more of the following motions: a sideways motion along the x-axis; a roll motion about the y-axis; or a yaw motion about the z-axis. In particular embodiments, a sideways flicking motion may include a motion substantially along the x-axis or a yaw motion about the z-axis. Additionally, such a sideways flicking motion may be accompanied by a relatively small amount of one or more of the following motions: a vertical motion along the z-axis; a roll motion about the y-axis; or a pitch motion about the x-axis. Although this disclosure describes and illustrates particular motions detected by particular motion sensors, this disclosure contemplates any suitable motions detected by any suitable motion sensors.

In particular embodiments, device 300 may determine that a particular motion of device 300 has occurred based on one or more signals from one or more motion sensors. As an example and not by way of limitation, device 300 may determine that a forward flicking motion has occurred based on detecting (with an accelerometer) an acceleration along the z-axis having a magnitude greater than a particular threshold z-axis acceleration value as well as detecting an acceleration along the x-axis having a magnitude less than a particular threshold x-axis acceleration value. If device 300 detects a x-axis acceleration that exceeds the threshold x-axis acceleration value, then device 300 may determine that the corresponding motion is not a valid forward flicking motion (e.g., the detected motion does not correspond to a forward flick). As another example and not by way of limitation, device 300 may determine that a sideways flicking motion has occurred based on detecting (e.g., with a gyroscope sensor) a yaw motion about the z-axis having an angular velocity greater than a particular threshold z-axis angular-velocity value as well as detecting a roll or pitch velocity that is below a particular threshold off-axis angular velocity value. If device 300 detects a pitch velocity that exceeds the threshold off-axis angular velocity value, then device 300 may determine that the corresponding motion is not a valid sideways flicking motion (e.g., the detected motion does not correspond to a sideways flick). Although this disclosure describes and illustrates particular motions determined by particular signals from particular sensors, this disclosure contemplates any suitable motions determined by any suitable signals from any suitable sensors.

Figure 4:
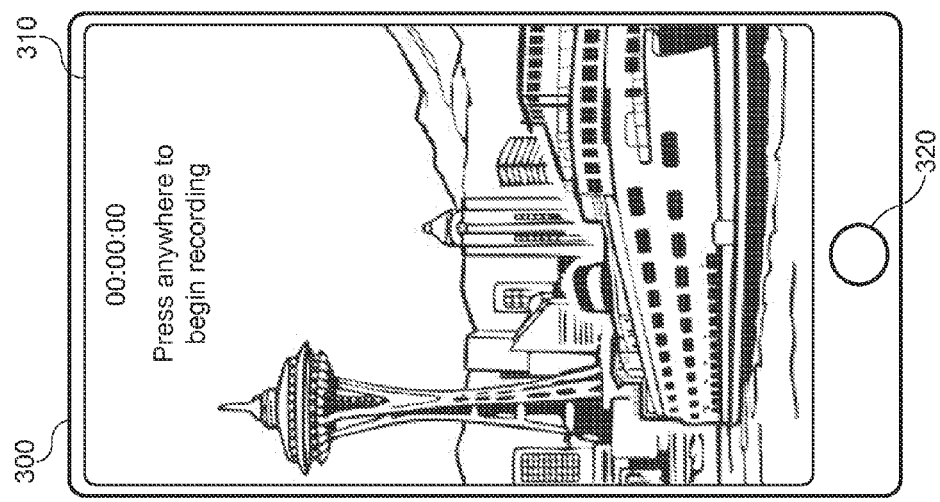
FIG. 4 illustrates an example user interface (UI) associated with an application for capturing multimedia content.

FIG. 4 illustrates an example user interface (UI) associated with an application for capturing multimedia content. In the example of FIG. 4, a UI is displayed on screen 310 of computing device 300. In particular embodiments, users of a computing device may interact with a UI to capture multimedia content and share the content with friends. In particular embodiments, a user may wish to rapidly or easily initiate the capture of multimedia content so they can record an image or video of a short-lived or spontaneous moment. Particular embodiments described herein may allow a user to quickly initiate capture of multimedia content without having to first specify what type of content to capture. After the content is captured, the user may then select one or more media types into which they would like to have the multimedia content encoded, stored, or uploaded.

In particular embodiments, a multimedia content item (which may also be referred to as multimedia content or captured multimedia content) may refer to one or more images or videos captured by device 300. In particular embodiments, capturing an image may refer to recording or storing a digital image, and capturing a video may refer to recording or storing a time series of two or more successive digital image frames. In particular embodiments, recording or capturing an image or an image frame may refer to receiving an optical image in the form of light incident on an image sensor of a camera, converting the received light into electronic information, and storing electronic information corresponding to the received optical image. In particular embodiments, a multimedia content item may refer to an audio recording captured using a microphone. As an example and not by way of limitation, a user may initiate the capturing of a multimedia content item by device 300 to record sound. As another example and not by way of limitation, in addition to capturing a series of image frames, capturing a video may also include recording sound while the video is being captured. In particular embodiments, a multimedia content item may refer to one or more captured images, one or more captured videos, one or more captured audio recordings, or any suitable combination thereof. As an example and not by way of limitation, a multimedia content item may refer to a combination of a video (which may include recorded sound) as well as one or more high-resolution images captured while the video was being recorded.

In particular embodiments, an image (which may also be referred to as a still image, a digital image, a photo, a digital photo, a photograph, a digital photograph, a picture, or a digital picture) may refer to a single digital image captured by a digital camera. An image may be captured or stored in any suitable format, such as for example, Joint Photographic Experts Group (JPEG) format, Tagged Image File Format (TIFF), Graphics Interchange Format (GIF), Portable Network Graphics (PNG) format, or bitmap (BMP) file format. Moreover, an image may have any suitable resolution, such as for example, 1280×720 pixels, 1920×1080 pixels, or 4096×2160 pixels. Although this disclosure describes and illustrates particular multimedia content items that include particular images having particular formats or resolutions, this disclosure contemplates any suitable multimedia content items that include any suitable images having any suitable formats or resolutions.

In particular embodiments, a video captured by device 300 may refer to a digital video that includes a series of image frames combined together to form a video recording. A video may be captured, encoded, or stored in any suitable format, such as for example, Moving Picture Experts Group-2 Part 2 (MPEG-2 Part 2), MPEG-4 Part 2, or H.264 format. Moreover, a video have any suitable resolution, such as for example 352×288 pixels, 720×576 pixels, 1280×720 pixels, or 2048×1080 pixels. In particular embodiments, an image frame may refer to a single still image of a video, and a video may include two or more image frames combined together to form a video recording. In particular embodiments, a video may be captured at a particular frame rate. In particular embodiments, a video may have a frame rate of 24 frames per second (FPS), 25 FPS, 30 FPS, or any suitable frame rate, where frame rate may refer to a number of still images or video frames per second of a video while being recorded or played back. As an example and not by way of limitation, a video captured at 25 FPS (Frame Rate=25 FPS) may have a time between successive frames of approximately 40 ms (=1/Frame Rate=1/25 seconds). As another example and not by way of limitation, a 10-second duration video recorded at 30 FPS may include approximately 300 discrete image frames. In particular embodiments, a video may include a series of image frames, where each image frame has an associated time stamp indicating an absolute time or a relative time within the video when the image was captured. In particular embodiments, a video may have a duration of 1 second, 10 seconds, 15 seconds, 30 seconds, 1 minute, 20 minutes, 1 hour, or any suitable duration. Although this disclosure describes and illustrates particular multimedia content items that include particular videos having particular formats, resolutions, frame rates, or durations, this disclosure contemplates any suitable multimedia content items that include any suitable videos having any suitable formats, resolutions, frame rates, or durations.

In particular embodiments, computing device 300 may receive a user input, the user input representing a request to launch an application for capturing multimedia content. In particular embodiments, user input may include a touch input, a button input, a particular motion of computing device 300, a change in light sensed by computing device 300, an audio input received by computing device 300, or any other suitable indicator of a user's request or intent to capture multimedia content. As an example and not by way of limitation, when device 300 is in a sleep mode or locked state, the application for capturing multimedia content illustrated in FIG. 4 may be automatically launched when a user presses button 320 (e.g., a user applies a single press or two successive presses to button 320). As another example and not by way of limitation, an application for capturing multimedia content may be launched when a user applies a double-tap touch input (or any other suitable touch input) to touch screen 310. As another example and not by way of limitation, a multimedia-content application may be launched when a user applies a particular motion to device 300 (e.g., a vertical flicking motion, a sideways flicking motion or a movement that changes device 300's orientation by approximately 90 degrees). Although this disclosure describes and illustrates particular applications for capturing multimedia content which are launched in particular manners, this disclosure contemplates any suitable applications for capturing multimedia content which are launched in any suitable manner.

In particular embodiments, upon being launched, an application for capturing multimedia content may display a live video preview of a scene visible through a camera of device 300. As illustrated in the example of FIG. 4, a scene representing the view from a camera of computing device 300 may be displayed on screen 310. In particular embodiments, a time indicator (e.g., displayed as "hours:minutes:seconds") may display an elapsed duration of a video during capture, a time location within a captured video, or a total duration of a captured video. In FIG. 4, screen 310 is showing a live video preview, and the time-indicator readout of "00:00:00" indicates that video capture has not yet been initiated.

In particular embodiments, computing device 300 may receive a user input, the user input representing a request to begin capturing a multimedia content item. In particular embodiments, a user input representing a request to begin capturing a multimedia content item may include a touch input. Additionally, a subsequent touch input may represent a request to terminate the capture process. As an example and not by way of limitation, a user may apply a tap input (e.g., a single tap or a double tap) to a surface of touch screen 310 to initiate recording of a video. As another example and not by way of limitation, a user may request to begin capturing a multimedia content item by applying a swipe, a pinch, a zoom, a particular touch-input pattern (e.g., a circular touch pattern or a cross touch pattern), or any suitable touch input or combination of touch inputs. As illustrated in the example of FIG. 4, a user may apply a press input anywhere on touch screen 310 to initiate capture of a multimedia content item, where a press input corresponds to a sustained contact with a surface of touch screen 310 by a stylus or the user's finger. For example, if a press input is applied for longer than 0.4 seconds, then device 300 may begin to record a video, and the recording may continue as long as the press input remains applied. The recording may be terminated when the user removes their finger from touch screen 310. In particular embodiments, a UI for capturing multimedia content may include a user interface element (e.g., an icon displayed on touch screen 310 or a highlighted or encircled region of touch screen 310) to which a user may apply a touch input to initiate capture of a multimedia content item. As an example and not by way of limitation, a one-inch diameter circle may be displayed on touch screen 310, and a user may apply a press or a double tap within the circle to initiate capture. Device 300 may only initiate capture if the touch input is located within the circle, and a touch input applied outside the circle may not be recognized as a request to initiate capture. In particular embodiments, user settings of device 300 may be configured to define which type of user input corresponds to a request to begin capturing a multimedia content item. As an example and not by way of limitation, a user may configure the user settings so that a particular touch input or a particular touch-input pattern corresponds to a request to begin capturing content. Similarly, a user may configure the user settings to associate a particular user input with a request to terminate capturing content. Although this disclosure describes and illustrates particular user inputs that represent particular requests, this disclosure contemplates any suitable user inputs that represent any suitable requests.

In particular embodiments, computing device 300 may include a motion sensor, and a user input representing a request to begin capturing a multimedia content item may include a motion detected by computing device 300. In particular embodiments, information from a motion sensor of device 300 may be used to determine that a user is requesting the capture (or the subsequent termination of the capture) of a multimedia content item. As an example and not by way of limitation, device 300 may include a gyroscope, and a motion of device 300 from a substantially horizontal orientation to a substantially upright or vertical orientation, as sensed by the gyroscope, may indicate a request to begin capturing multimedia content. Additionally, a subsequent motion back to a horizontal orientation may indicate a request to terminate the capture. A user may hold device 300 in their hand with device 300 oriented horizontally (e.g., camera is pointed approximately downward), and when the user moves device 300 to an upright or vertical orientation, this motion to a substantially orthogonal orientation (with respect to the original horizontal orientation) may represent a request to begin recording a video. As another example and not by way of limitation, device 300 may include an accelerometer, and a flicking motion of at least a first end of device 300 may be sensed by the accelerometer and may indicate a request to begin capturing multimedia content. A user may hold device 300 in their hand, and when the user applies a forward or sideways flicking motion to device 300, the flicking motion may represent a request to begin recording a video. Additionally, a subsequent flicking motion may indicate a request to terminate the capture. In particular embodiments, a motion of device 300 may include any suitable motion or any suitable combination of motions. As an example and not by way of limitation, a double-flicking motion (e.g., two successive forward flicking motions) may be used to indicate a request to begin capturing multimedia content. Although this disclosure describes and illustrates particular motions that represent particular requests, this disclosure contemplates any suitable motions that represent any suitable requests.

In particular embodiments, computing device 300 may include a light sensor, and a user input representing a request to begin capturing a multimedia content item may include a change in brightness or an amount of light detected by computing device 300. As an example and not by way of limitation, computing device 300 may include a light sensor for determining a brightness or an amount of ambient light present on or around device 300. As another example and not by way of limitation, computing device 300 may determine an amount of light that is present based on a signal from a camera of device 300 (e.g., an amount of light reaching a camera's image sensor may be determined from information or a signal from the camera). In particular embodiments, an increase in brightness by a particular threshold amount or to above a particular threshold value may indicate a request to begin capturing multimedia content. As an example and not by way of limitation, when a person removes device 300 from a pocket or purse (where the light level is relatively low), device 300 may detect an increase in the amount of light received by its camera, and this increase in detected light may represent a request to begin recording a video. As another example and not by way of limitation, when the amount of light detected by device 300 increases by a particular amount, device 300 may launch an application for capturing multimedia content in response to detecting this increase in light. In this case, when a user removes device 300 from their pocket, device 300 may display a UI similar to that illustrated in FIG. 4. Although this disclosure describes particular light sensors that produce particular signals representing particular requests, this disclosure contemplates any suitable light sensors that produce any suitable signals representing any suitable requests.

In particular embodiments, computing device 300 may include a microphone, and a user input representing a request to begin capturing a multimedia content item may include a particular sound or voice command. As an example and not by way of limitation, a user may say an audible command (e.g., "Go" or "Start recording") that is received as an audio signal by a microphone of device 300, and the received audio signal may be interpreted as representing a request to begin capturing multimedia content. Similarly, a user may say another audible command (e.g., "Stop" or "End recording") that is received by a microphone of device 300 and interpreted as representing a request to terminate the capture of multimedia content.

In particular embodiments, a combination of two or more user inputs may represent a request to begin capturing multimedia content. As an example and not by way of limitation, a flicking motion of device 300 followed by a touch input may represent a request to begin capturing multimedia content. As another example and not by way of limitation, a change in orientation of device 300 (e.g., a motion to a substantially orthogonal or upright orientation) accompanied by a change in an amount of light detected by device 300 may represent a request to begin capturing multimedia content. In particular embodiments, device 300 may require an occurrence of two or more particular user inputs in order to generate a valid request. As an example and not by way of limitation, if device 300 detects only one user input (e.g., a change in light level) but not the other (e.g., an orthogonal motion), then device 300 may determine that the one detected user input does not represent a valid request. In particular embodiments, requiring a combination of two or more user inputs to represent a particular request may reduce the likelihood of inadvertently triggering a request (e.g., by an accidental touch input or an unintended motion of device 300).

In particular embodiments, in response to a received user input representing a request to begin capturing a multimedia content item, device 300 may initiate capture of the multimedia content item. In particular embodiments, capturing a multimedia content item may include recording a digital video. In particular embodiments, capturing a multimedia content item may include recording an audio signal from a microphone of device 300. As an example and not by way of limitation, capturing a multimedia content item may include recording a video from a camera of device 300 as well as recording a corresponding audio signal from a microphone of device 300. As another example and not by way of limitation, when a user provides a particular user input (e.g., user flicks device 300 or moves device 300 from a horizontal orientation to an upright orientation), device 300 may automatically begin recording a video.

In particular embodiments, capturing a multimedia content item may include recording a digital video as well as capturing one or more high-quality still images. As an example and not by way of limitation, while recording a video, device 300 may also capture high-quality still images at regular intervals (e.g., every 1, 5, or 10 seconds, or at any suitable interval of time). As another example and not by way of limitation, device 300 may automatically capture one or more high-quality still images when beginning to record a video or just after a video recording has been terminated. As another example and not by way of limitation, device 300 may record a video, and a flash or other illumination source of device 300 may be activated each time a high-quality still image is captured, which may allow for capturing still images with higher resolution or detail than the recorded video. In particular embodiments, a recorded video may have a particular format or resolution (e.g., MPEG-4 format with a 720×576-pixel resolution), and a recorded image may have another particular format or resolution (e.g., JPEG format with a 1920×1080-pixel resolution). As an example and not by way of limitation, a captured still image may have a higher resolution (e.g., 1920×1080 pixels) than a recorded-video resolution (e.g., 720×576-pixels).

In particular embodiments, computing device 300 may receive a user input, the user input representing a request to terminate the capture of a multimedia content item. As an example and not by way of limitation, device 300 may begin recording a video in response to a first received user input, and the recording may be terminated when device 300 receives a second user input. In particular embodiments, a user input representing a request to terminate the capturing of a multimedia content item may include a motion detected by computing device 300. As an example and not by way of limitation, device 300 may include a gyroscope, and a motion of device 300 from an original orientation (e.g., an upright or vertical orientation) to another orientation that is approximately orthogonal to the original orientation may represent a request to terminate the recording of a video. Moving device 300 to an orientation that is approximately orthogonal to an original orientation may include a rotation (e.g., a pitch motion) of device 300 by approximately 90°±20°. A user may move device 300 from a substantially downward-facing or horizontal orientation to a substantially upright or vertical orientation to initiate recording a video. Device 300 may be held approximately upright while recording the video, and when the user returns device 300 to an approximately horizontal orientation, device 300 may automatically terminate the video recording. As another example and not by way of limitation, device 300 may include an accelerometer, and a flicking motion of at least a first end of device 300 may be sensed by the accelerometer and may indicate a request to terminate capturing multimedia content. A user may apply a first flicking motion to device 300 to initiate recording a video, and when the user applies a second flicking motion to device 300, the recording may be terminated.

In particular embodiments, a user input representing a request to terminate the capturing of a multimedia content item may include a touch input. As an example and not by way of limitation, a user may apply a tap input (e.g., a single tap or a double tap) to a surface of touch screen 310 to initiate recording of a video, and when the user applies a subsequent tap input to touch screen 310, the recording may be stopped. As another example and not by way of limitation, a user may request to terminate the capturing of a multimedia content item by applying a swipe, a pinch, a zoom, a particular touch-input pattern (e.g., a circular touch pattern or a cross touch pattern), or any suitable touch input or combination of touch inputs. As another example and not by way of limitation, a press input applied to touch screen 310 may initiate the recording of a video, and the recording may continue as long as the user's finger remains in contact with touch screen 310. The recording may be terminated when the user removes their finger from touch screen 310, or the recording may be terminated a predetermined amount of time (e.g., 0.5 seconds) after the user removes their finger from touch screen 310.

In particular embodiments, one or more initial user inputs may represent a request to begin capturing a multimedia content item, and one or more subsequent user inputs may represent a request to terminate the capture process. In particular embodiments, an initial and a subsequent user input may be the same user inputs. As an example and not by way of limitation, a double-tap input may be used to initiate a video recording, and the same double-tap input may be used to terminate the recording. As another example and not by way of limitation, a forward flicking motion may initiate a video recording, and the same forward flicking motion may terminate the recording. In particular embodiments, an initial user input representing a request to begin capturing a multimedia content item may be different from a subsequent user input representing a request to terminate the capture. As an example and not by way of limitation, a forward flicking motion may represent a request to begin a video recording, and a tap input may represent a request to terminate the recording. As another example and not by way of limitation, a double-tap input may be used to initiate a video recording, and a single-tap input may be used to terminate the recording. As another example and not by way of limitation, an orthogonal change in orientation may initiate a video recording, and a tap input may represent a request to terminate the recording.

In particular embodiments, a combination of two or more user inputs may represent a request to begin or a request to terminate capturing multimedia content. As an example and not by way of limitation, a change in light level along with an orthogonal change in orientation detected by device 300 may represent a request to begin capturing a video, and a single-tap input may represent a request to terminate the video capture. As another example and not by way of limitation, an orthogonal change in orientation of device 300 along with a press input may initiate recording of a video, and the recording may be terminated when the user ends the press input by removing their finger or stylus from touch screen 310. In particular embodiments, two or more user inputs may be required to occur within a particular period of time in order to represent a valid request. As an example and not by way of limitation, a forward flicking motion followed by a single-tap input within 5 seconds of the forward flicking motion may initiate a video recording, and a subsequent single-tap input may terminate the recording. If the initial single-tap input does not occur within a particular period of time (e.g., within 5 seconds) of the flicking motion, then device 300 may not initiate a video recording. Although this disclosure describes and illustrates particular user inputs or particular combinations of user inputs configured to initiate or terminate multimedia capture, this disclosure contemplates any suitable user inputs or any suitable combinations of user inputs configured to initiate or terminate multimedia capture.

In particular embodiments, capturing of a multimedia content item may be automatically terminated after a predetermined amount of time has elapsed from when the capturing was initiated. As an example and not by way of limitation, when a video recording is initiated, device 300 may capture a particular duration of video, such as for example, 10 seconds, 30 seconds, 1 minute, 10 minutes, or any suitable duration. As another example and not by way of limitation, after receiving a user input representing a request to begin capturing a multimedia content item, device 300 may capture the multimedia content for a particular amount of time (e.g., 30 seconds) and then automatically terminate the capture without receiving input from a user. In particular embodiments, capturing of a multimedia content item may be terminated either by a particular user input or after a predetermined amount of time has elapsed from the beginning of capture. As an example and not by way of limitation, a user may apply a single-tap input to terminate a recording. If a recording continues for a particular amount of time (e.g., 5 minutes), then device 300 may automatically terminate the recording without receiving a single-tap input.

In particular embodiments, in response to receiving a user input representing a request to begin capturing a multimedia content item, device 300 may change from one operating mode to another. As an example and not by way of limitation, if device 300 is in a sleep mode or a locked state, a user input to begin capturing multimedia content (e.g., a forward flick) may result in device 300 automatically beginning to record a video. As another example and not by way of limitation, regardless of the mode device 300 is in (e.g., sleep mode, locked state, or running an application), a user input to begin capturing multimedia content may result in device 300 automatically beginning to record a video. As another example and not by way of limitation, regardless of the mode device 300 is in, a user input to begin capturing multimedia content may result in device 300 displaying a UI for capturing multimedia content (e.g., the UI illustrated in FIG. 4). A user may apply a forward flick to device 300, and from a sleep mode, device 300 may initiate or display an application for capturing multimedia content. When the user applies another user input (e.g., a tap or press input) device 300 may then begin recording a video. Although this disclosure describes and illustrates particular user inputs that result in particular operating modes, this disclosure contemplates any suitable user inputs that result in any suitable operating modes.

Figure 5:
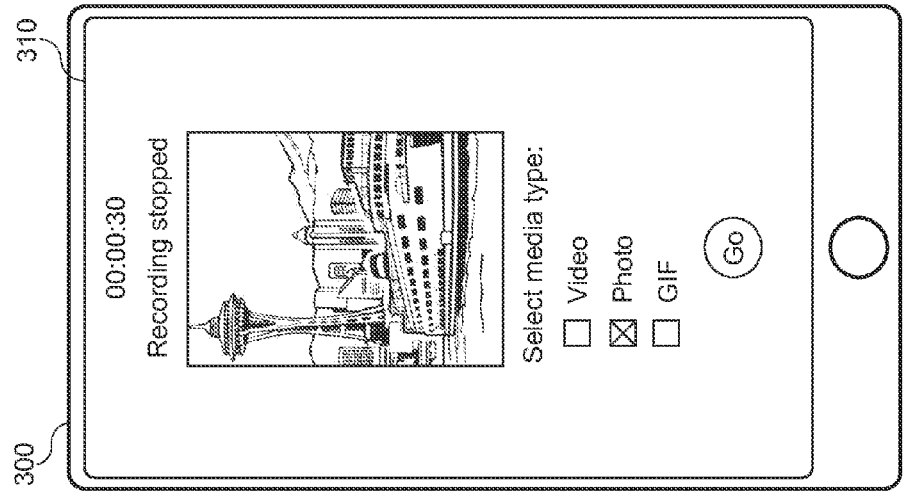
FIG. 5 illustrates an example UI for selecting a media type after a multimedia content item has been captured.

FIG. 5 illustrates an example UI for selecting a media type after a multimedia content item has been captured. In the example of FIG. 5, the message "Recording stopped" indicates that media capture has been terminated, and the time-indicator readout of "00:00:30" indicates that the captured video is 30 seconds in length. In particular embodiments, after capture of a multimedia content item is complete, device 300 may present one or more media types to select from. As illustrated in the example of FIG. 5, after video capture is complete, device 300 may present a post-capture selection UI which allows a user to select from various media types (e.g., video, photo, or GIF). As an example and not by way of limitation, the captured multimedia content item may be a video, and if the user selects the "photo" media type from a media-type selection UI, device 300 may allow the user to select one or more frames from the captured video to be exported as images. Device 300 may present any suitable media types for a user to select from, such as for example, a video of any suitable format or type (e.g., a video in MPEG-4 Part 2 or H.264 format, a time-lapse video, a slow-motion video, or a hyperlapse video), a photo (e.g., a still image in JPEG, bitmap, or any suitable image format), a GIF image or animation, or an audio file. Although this disclosure describes and illustrates particular media types having particular formats, this disclosure contemplates any suitable media types having any suitable formats.

In particular embodiments, device 300 may receive a selection of one or more media types. As illustrated in FIG. 5, a user may select a photo media type, indicating the user wishes to select one or more image frames from the captured video. In particular embodiments, device 300 may receive one, two, three, or any suitable number of selections of media types. As an example and not by way of limitation, a user may select a photo media type as well as a GIF media type, indicating that the user wishes to extract an image frame from the captured video as well as a portion (e.g., a 5-second excerpt) of the video.

Figure 6:
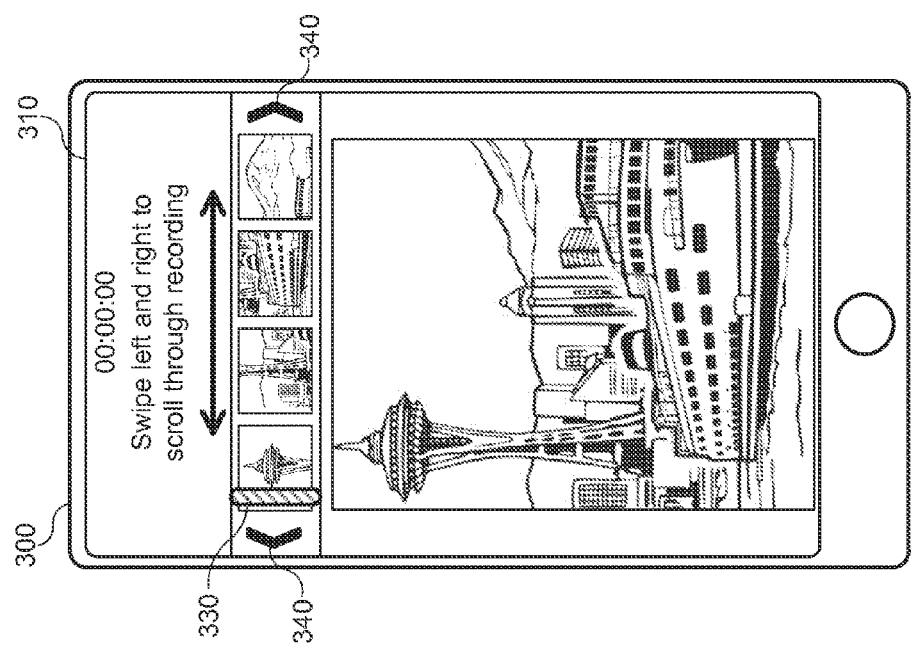
FIG. 6 illustrates an example UI for selecting a portion of a captured multimedia content item.

FIG. 6 illustrates an example UI for selecting a portion of a captured multimedia content item. In particular embodiments, after receiving a selection of one or more media types, device 300 may allow a user to select one or more portions of a captured multimedia item to be exported. As illustrated in the example of FIG. 6, a user may scroll through a recorded video by swiping left or right on display 310, by moving scroll bar 330 left or right, or by tapping on arrows 340. As an example and not by way of limitation, a user may scroll through a recorded video to select a beginning point and an end point for an excerpt of the recorded video to be extracted as a video or GIF animation. In the example of FIG. 6, a user may select an excerpt beginning at the 5-second point (e.g., time indicator 00:00:05) and ending at the 15-second point (e.g., time indicator 00:00:15), and this 10-second section of the recorded video may be extracted as a GIF animation or as a separate video file. As another example and not by way of limitation, a user may listen to an audio portion of a recorded video, and the user may select a section of the audio portion to be extracted as a separate audio file.

Figure 7:
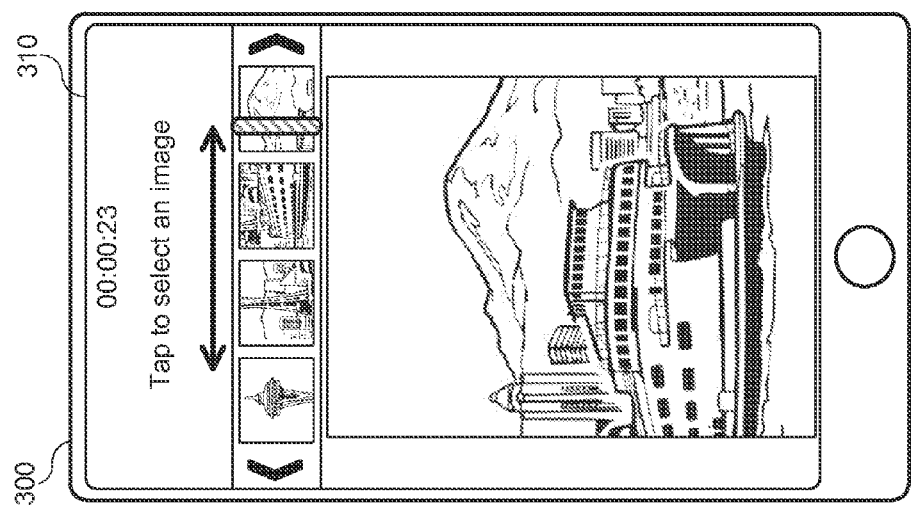
FIG. 7 illustrates an example UI for selecting an image from a captured multimedia content item.

FIG. 7 illustrates an example UI for selecting an image from a captured multimedia content item. In particular embodiments, a user may scroll through a recorded video and select one or more frames from the video to be extracted as images. In the example of FIG. 7, a user has scrolled to the 23-second point of the video, and the user may provide a tap input to select the image shown on display 310. In particular embodiments, a media-capture application may, by default, capture video, and after the video is captured, a user may select one or more frames from the captured video to be extracted as images. As an example and not by way of limitation, selecting frames from a captured video may allow a user to select photos with desired characteristics. A frame from a video may be selected based on lighting or exposure characteristics or based on whether or not people appear in the frame (e.g., a user may not want extraneous people to appear in a photo of a nature scene). A frame showing a person or a group of people (e.g., a group of friends or family) may be selected based on the appearance of the people in the particular frame. A user may select a frame in which people are not blinking (e.g., their eyes are open), do not have awkward expressions, are smiling, or are looking directly at the camera. In particular embodiments, capturing of a multimedia content item may include recording a video as well as capturing one or more high-quality images. As an example and not by way of limitation, a user may select a portion of a recorded video to extract as a GIF animation, and the user may also select an image from a set of captured high-quality images.

In particular embodiments, device 300 may encode one or more portions of captured multimedia content in accordance with a media-type selection to produce a corresponding encoded media object. In particular embodiments, an encoded media object may refer to a video, an image, a GIF image or animation, an audio file, or any other suitable media having any suitable format, type, or resolution, where the encoded media object is derived from a captured multimedia content item. In particular embodiments, encoding a portion of multimedia content may refer to converting, copying, or translating a portion of a captured multimedia content item into a selected media type, where the selected media type may be different from or the same as the media type of the multimedia content. As an example and not by way of limitation, in response to receiving a media-type selection and a selection of an image or a section of a captured multimedia content item, device 300 may extract the selected image or section from the captured multimedia. Device 300 may extract the selected image or section by copying it from the captured multimedia content item, and then the extracted copy may be converted into the selected media type. In particular embodiments, a captured multimedia content item may not be affected or changed by such an encoding process; rather, an image or section of a multimedia content item may be copied into another file or memory location and then encoded into a desired media type.

In particular embodiments, in response to receiving a selection of a media type and a selection of a portion of captured multimedia content, device 300 may convert the selected portion into a media object having the selected media type. In particular embodiments, device 300 may capture multimedia content in a video format, and a user may select a photo media type and a particular frame from a captured video. In response to the user selection, device 300 may extract or copy a selected frame and convert it into an image (e.g., an image in JPEG format) to produce the requested encoded media object. In particular embodiments, a user may select a video media type and a particular section of a captured video, and device 300 may copy the selected section from the captured video and convert it into a separate video or into a GIF animation. A converted video may have the same media type as the captured video, or the converted video may have a different media type or a different resolution. As an example and not by way of limitation, a captured video may have a MPEG-4 Part 2 format and a 1280×720-pixel resolution, and an extracted video may have a H.264 format and a 352×288-pixel resolution.

In particular embodiments, post-capture image processing may be applied to an extracted portion of captured multimedia content. As an example and not by way of limitation, an image frame extracted from a video may have post-capture image processing automatically applied to enhance image quality (e.g., by optimizing hue, brightness, or contrast; adjusting sharpness; or cropping the image). As another example and not by way of limitation, an extracted excerpt of a captured video may have image processing applied to enhance image quality or to apply image stabilization (e.g., to reduce the effects of camera shake). In particular embodiments, a user may modify a selected portion of captured multimedia content. As an example and not by way of limitation, a user may crop an image or video or adjust the settings (e.g., hue, brightness, or contrast) of an image or video. In particular embodiments, after selecting a portion (e.g., an image, video excerpt, or GIF animation) of a captured video to be extracted, a user may add one or more tags, notes, or other textual elements to the extracted portion. As an example and not by way of limitation, a user may select a frame from a captured video to extract as an image, and the user may add tags identifying people in the image. In particular embodiments, a user may add one or more graphical elements or edits (e.g., stickers, doodles, or image distortions) to an extracted portion of captured content.

In particular embodiments, a process for capturing multimedia content and then presenting options for selection of media type after capture is complete may be referred to as post-capture selection of media type. With a post-capture selection process, a user may perform a media-type selection after the multimedia content has already been captured, and a user need not select a media type prior to capturing the content. As an example and not by way of limitation, in response to a request to capture multimedia content, device 300 may, by default, record a video. Then, device 300 may allow a user to select a media type after the capture is complete. In particular embodiments, a post-capture selection of media type may allow a user to easily or quickly record an event without first having to select a media type. A user can initiate recording by providing a user input (e.g., a tap or a forward flicking motion), and the user does not need to specify whether they want to capture a video, an image, a GIF, or any other suitable media type until after the recording is completed. Rather than delaying the start of a recording by having to decide which media type to capture, a user can begin recording immediately after making a request to record. A post-capture selection process may allow a user to capture fun, interesting, exciting, or short-lived moments, such as for example, a game-winning basket in a basketball game, a moment when a friend is doing something funny, or a moment when a pet is doing something cute. In particular embodiments, after a moment is captured as a video recording, a user may review the recording and then select whether to extract a frame as an image, a portion of the recording as a video or GIF animation, or both.

In particular embodiments, device 300 may capture a multimedia content item and then perform an encoding process to produce an encoded media object having a media type selected by a user. In particular embodiments, after an encoded media object is produced from an extracted portion of captured media, a user may store the media object on device 300, may send the media object to another user, or may upload the media object to an Internet-based service, such as for example social-networking system 160. As an example and not by way of limitation, an encoded media object (e.g., an extracted image or portion of a video) may be uploaded to social-networking system 160 where it may be shared with friends via the online social network.

In particular embodiments, a multimedia content item may be uploaded to an Internet-based service (e.g., social-networking system 160) after capture of the item is complete. As an example and not by way of limitation, device 300 may receive a request to capture a multimedia content item, and after the capturing is complete, device 300 may upload the captured multimedia content item to social-networking system 160. A user who recorded the content may interact with social-networking system 160 to select one or more media types, and social-networking system 160 may perform an encoding process to produce a corresponding encoded media object. As another example and not by way of limitation, a captured multimedia content item may be uploaded to social-networking system 160, and a viewer (e.g., a friend of the person who captured the content) may select a media type (e.g., a frame, a GIF animation, a portion of a video, or the entire recorded content) they wish to view. Social-networking system 160 may perform an encoding process in response to the viewer's media-type selection and present the encoded media object to the viewer.

In particular embodiments, a facial-recognition process may be applied to a captured multimedia content item or to an encoded media object. As an example and not by way of limitation, device 300 or social-networking system 160 may perform facial recognition to identify one or more people who appear in a captured multimedia content item or in an encoded media object. A user may select an image from a captured multimedia content item, and facial recognition may be performed on the image to identify one or more people in the image. In particular embodiments, device 300 may display a suggestion to share an encoded media object with one or more people who are identified in the media object. As an example and not by way of limitation, in a post-capture selection screen, a user may be presented with a suggestion to share an image (e.g., an image extracted from a captured video) with one or more identified people who appear in the image.

In particular embodiments, a suggestion to share multimedia content or an encoded media object may be based at least in part on social-networking information. A user may be prompted to share a photo or video with one or more people connected to the user. As an example and not by way of limitation, social-networking system 160 may provide a suggestion to share a photo based on social-graph connections between a user who captured the multimedia content and people in the photo identified by facial recognition. A user node 202 in a social graph 200 of social-networking system 160 may represent a user who captured a multimedia content item, and one or more other user nodes 202 may represent one or more respective people identified in the captured multimedia content or in a corresponding encoded media object. If the user node 202 of the user who captured the content is within a threshold degree of separation from a user node 202 of an identified person, then a suggestion to share a media object with the identified person may be presented. If the user node 202 of the user who captured the content is associated with an affinity coefficient for a user node 202 of an identified person, where the affinity coefficient is above a particular threshold value, then a suggestion to share with the identified person may be presented.

In particular embodiments, a suggestion to create an association between an encoded media object and an identified person may be displayed to a user. In particular embodiments, an association may include an edge 206 or a tag. As an example and not by way of limitation, a user who captured a multimedia content item may be presented with a suggestion to create an edge 206 between a concept node 204 representing the encoded media object and a user node 202 representing a person identified in the encoded media object. As another example and not by way of limitation, creating an association between an encoded media object and an identified person may include tagging the encoded media object to indicate the identified person. Although this disclosure describes particular suggestions based on particular social-networking information, this disclosure contemplates any suitable suggestions based on any suitable social-networking information.

In particular embodiments, an image-analysis process may be applied to a captured multimedia content item or to an encoded media object. As an example and not by way of limitation, device 300 or social-networking system 160 may perform image analysis to identify one or more entities appearing in a captured multimedia content item or in an encoded media object. As an example and not by way of limitation, identified entities may include a place (e.g., a restaurant, movie theater, beach, park, museum, landmark, or city), a business, a sports team, an animal (e.g., a person's pet), an activity (e g, hiking, bicycling, swimming, or eating), a product (e.g., a computer, car, or bicycle), or any other suitable entity or combination of suitable entities. If a multimedia content item is captured showing a group of friends on a bicycle ride across the Golden Gate Bridge, then an image-analysis process may identify one or more of the following entities: the Golden Gate Bridge, San Francisco, bicycles, and bicycling.

In particular embodiments, a suggestion to create an association (e.g., an edge 206 or a tag) between an encoded media object and an identified entity may be displayed to a user. As an example and not by way of limitation, a user who captured a multimedia content item may be presented with a suggestion to create an edge 206 between a concept node 204 representing an encoded media object and a concept node 204 representing an identified entity in the encoded media object. For example, a user may be presented with suggestions to create edges 206 between concept node 204 representing an image of friends on a bicycle ride and concept nodes 204 representing the Golden Gate Bridge, San Francisco, bicycles, and bicycling. As another example and not by way of limitation, an association between an encoded media object and an identified entity may include a tag visually displayed to indicate the identified entity in the encoded media object.

In particular embodiments, a location of computing device 300 during the capturing of a multimedia content item may be detected. As an example and not by way of limitation, a location of computing device 300 may be determined based on a GPS signal, a cellular-telephone signal, a Wi-Fi signal, or any other suitable signal received by device 300. In particular embodiments, a suggestion to tag an encoded media object with a detected location may be displayed to a user. As an example and not by way of limitation, after a user captures a multimedia content item, device 300 may present a suggestion to tag an encoded media object derived from the captured multimedia content item with a detected location of device 300. For example, if a user extracts an image of the Eiffel Tower from a captured video, then the user may be prompted with a suggestion to add an "Eiffel Tower" or "Paris" location tag to the extracted image.

In particular embodiments, device 300 may make a prediction of a selected media type, and during capture of a multimedia content item, device 300 may adjust one or more capturing parameters based on the predicted media type. As an example and not by way of limitation, device 300 may predict that during post-capture selection a user is likely to select an image media type, and based on that prediction, device 300 may adjust one or more capturing parameters in real time while capturing a multimedia content item. As an example and not by way of limitation, capturing parameters may include a type, format, or resolution of the multimedia content item.

In particular embodiments, predicting a selected media type may be based at least in part on historical information associated with one or more previously captured multimedia content items. As an example and not by way of limitation, historical information may include what actions a user has taken in the past with previously captured media or how a user has shared previously captured multimedia content. As an example and not by way of limitation, if a user has previously shared photos, then device 300 may periodically capture high-resolution images while recording a video.

In particular embodiments, predicting a selected media type may be based at least in part on one or more user preferences. As an example and not by way of limitation, user preferences may include or may be based on one or more of the following: media types associated with a user's profile; media types uploaded or downloaded by a user; media types shared by a user or among friends of a user; or media types which have a high rate of social interaction by a user (e.g., media types the user typically views, likes, or comments on). As an example and not by way of limitation, if a user has previously interacted with GIF animations, then device 300 may adjust capturing parameters during recording to be optimized for exporting a GIF animation.

In particular embodiments, predicting a selected media type may be based at least in part on one or more properties of a captured multimedia content item. As an example and not by way of limitation, device 300 may predict a selected media type based on what is being captured during recording, and device 300 may adjust one or more capturing parameters accordingly. As an example and not by way of limitation, if there is a significant amount of motion of device 300 while recording or a significant amount of change in composition of captured frames (e.g., changes in color or light levels), then device 300 may predict that the user may select a video media type and may adjust capturing parameters accordingly.

In particular embodiments, predicting a selected media type may be based at least in part on status information associated with device 300. As an example and not by way of limitation, status information may include battery level of device 300, network connectivity of device 300 (e.g., device 300 is connected to a cell tower or to a Wi-Fi access point), available storage or memory of device 300, or a type of data plan of device 300. As an example and not by way of limitation, if the amount of available storage of device 300 is getting low, then device 300 may reduce the resolution of a multimedia content item during recording so that it consumes less memory. As another example and not by way of limitation, if device 300 is connected to a cell tower, then device 300 may reduce the resolution of a multimedia content item during recording so that a resulting encoded media object may be efficiently uploaded to social-networking system 160 via a cellular signal. As another example and not by way of limitation, if device 300 has a data plan with a limited amount of data, device 300 may reduce the resolution of a multimedia content item during recording to reduce the size of a resulting encoded media object. Although this disclosure describes particular predications based on particular information, this disclosure contemplates any suitable predications based on any suitable information.

In particular embodiments, after capturing of a multimedia content item is terminated, device 300 may present one or more portions of the captured multimedia content item as suggested portions to be encoded. As an example and not by way of limitation, in a post-capture selection screen, a user may be presented with one or more suggested images or portions of a recorded video. In particular embodiments, one or more suggested portions may be determined based at least in part on the recorded content. As an example and not by way of limitation, suggested portions of a recorded video may be determined based on whether there is a significant amount of motion, activity, or change in color or brightness. As another example and not by way of limitation, a portion of a recorded video may be suggested if a person, animal, or other moving object enters a frame of the video. In particular embodiments, one or more suggested portions may be determined based at least in part on social-networking information. As an example and not by way of limitation, one or more frames of a captured video may be suggested to a user for extraction as an image or a video clip if the frame(s) includes one or more people who are socially connected to the user.

In particular embodiments, a portion of captured multimedia content may not be presented to a user as a suggested portion to be encoded. In particular embodiments, device 300 may refrain from presenting a suggestion to extract a particular portion of captured multimedia content based at least in part on social-networking information. As an example and not by way of limitation, a particular frame from a captured video may not be suggested to a user if the frame includes one or more of the following: a person who is not a friend of the user; a person who has been unfriended or blocked by the user; a person who has a low affinity coefficient with respect to the user (e.g., an affinity coefficient below a threshold value); or a person who has a negative or contentious relationship with the user (e.g., the user and the identified person are associated with negative comments or posts with respect to one another). As an example and not by way of limitation, a user may not be presented with a suggestion to extract a frame that includes an ex-spouse or ex-partner. As an example and not by way of limitation, a user may be presented with a suggestion to extract a frame where an unwanted person has exited the frame or has moved to a location where they may be cropped from the frame. In particular embodiments, device 300 may refrain from presenting a suggestion to extract a particular portion of captured multimedia content based at least in part on one or more entities identified in the particular portion. As an example and not by way of limitation, a particular frame from a captured video may not be suggested to a user if the frame includes content that might be considered objectionable, offensive, or undesirable (e.g., nudity, profanity, or an offensive gesture). In particular embodiments, device 300 may present a suggestion to blur, crop, mute, or remove some part of a multimedia content item. As an example and not by way of limitation, before or after encoding a frame of a captured video, device 300 may present a suggestion to a user to blur, crop, or remove part of the frame. For example, a person who has a negative relationship with the user may be cropped out of a frame, or an offensive gesture may be blurred so it cannot be seen. As another example and not by way of limitation, a user may be presented with a suggestion to mute an audio portion of a video (e.g., to remove profanity or excessive noise). In particular embodiments, part of captured multimedia content may be automatically removed. As an example and not by way of limitation, if an extracted portion of a multimedia content item contains objectionable material (e.g., a person with a negative relationship to the viewing user), the objectionable material may be automatically cropped, blurred, or muted to remove the objectionable material.

Figure 8:
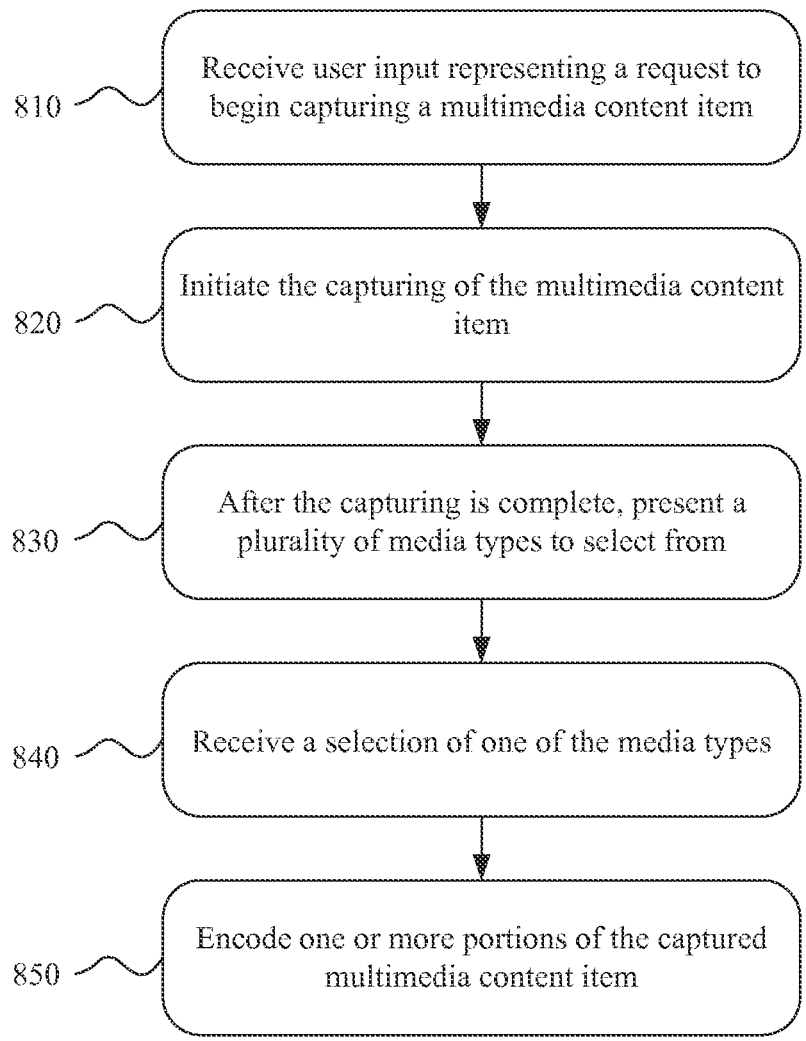
FIG. 8 illustrates an example method for post-capture selection of a media type.

FIG. 8 illustrates an example method 800 for post-capture selection of a media type. The method may begin at step 810, where computing device 300 may receive a user input, the user input representing a request to begin capturing a multimedia content item. At step 820, in response to the user input, computing device 300 may initiate the capturing of the multimedia content item. At step 830, after the capturing is complete, computing device 300 may present a plurality of media types to select from. At step 840, computing device 300 may receive a selection of one of the media types. At step 850, in response to the received selection, one or more portions of the captured multimedia content item may be encoded, at which point the method may end. One or more portions of the captured multimedia content item may be encoded in accordance with the media-type selection to produce a corresponding encoded media object. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for post-capture selection of a media type including the particular steps of the method of FIG. 8, this disclosure contemplates any suitable method for post-capture selection of a media type including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
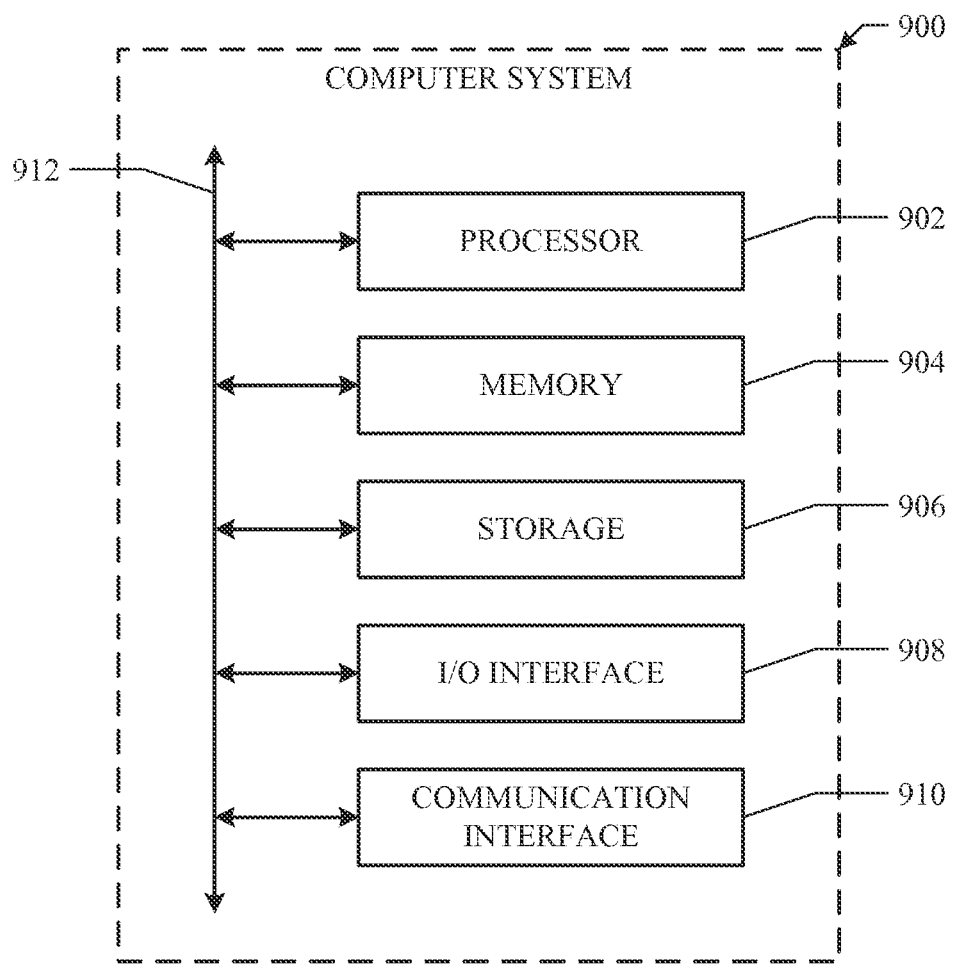
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    receiving, by a computing device, a user input, the user input representing a request to begin capturing a multimedia content item;
    in response to the user input, initiating, by the computing device, the capturing of the multimedia content item;
    terminating, by the computing device, the capturing of the multimedia content item after detecting a motion of the computing device, the detected motion comprising a change in an original orientation of the computing device to a substantially orthogonal orientation or a flicking motion of at least a first end of the computing device;
    after the capturing is complete, presenting, by the computing device, a plurality of media types to select from;
    receiving, by the computing device, a selection of one of the media types; and
    in response to the received selection, encoding, by the computing device, one or more portions of the captured multimedia content item in accordance with the media-type selection to produce a corresponding encoded media object.

2. The method of claim 1, wherein:
    the computing device comprises a touch sensor; and
    the user input comprises a tap or press applied to the touch sensor by a finger or stylus.

3. The method of claim 1, wherein:
    the computing device comprises a motion sensor; and the user input comprises another motion detected by the computing device.

4. The method of claim 3, wherein the motion sensor comprises a gyroscope or an accelerometer.

5. The method of claim 1, further comprising, during the capturing of the multimedia content item, capturing one or more high-quality still images.

6. The method of claim 1, wherein the multimedia content item comprises a digital video.

7. The method of claim 1, wherein the plurality of media types comprises video, still image, or a Graphics Interchange Format (GIF) image or animation.

8. The method of claim 1, further comprising:
receiving a selection of an image or a section of the captured multimedia content item; and
extracting the selected image or section from the captured multimedia content item.

9. The method of claim 1, further comprising performing facial recognition to identify one or more people who appear in the captured multimedia content item or in the encoded media object.

10. The method of claim 9, further comprising displaying a suggestion to share the encoded media object with one or more of the identified people.

11. The method of claim 9, further comprising displaying a suggestion to create an association between the encoded media object and one or more of the identified people.

12. The method of claim 1, further comprising performing image analysis to identify one or more entities appearing in the captured multimedia content item or in the encoded media object.

13. The method of claim 12, further comprising displaying a suggestion to create an association between the encoded media object and the identified entities.

14. The method of claim 1, further comprising:
detecting a location of the computing device during the capturing of the multimedia content item; and
displaying a suggestion to tag the encoded media object with the location.

15. The method of claim 1, further comprising:
predicting the selected media type; and
during the capturing of the multimedia content item, adjusting one or more capturing parameters based on the predicted media type.

16. The method of claim 15, wherein the predicting the selected media type is based at least in part on historical information associated with one or more previously captured multimedia content items, user preferences, one or more properties of the captured multimedia content item, or status information associated with the computing device.

17. The method of claim 1, further comprising, after the capturing of the video is terminated, presenting one or more portions of the captured multimedia content item as suggested portions to be encoded.

18. One or more computer-readable non-transitory storage media embodying software that is operable when executed by a computing device to:
receive a user input, the user input representing a request to begin capturing a multimedia content item;
initiate, in response to the user input, the capturing of the multimedia content item;
terminate the capturing of the multimedia content item after detecting a motion of the computing device, the detected motion comprising a change in an original orientation of the computing device to a substantially orthogonal orientation or a flicking motion of at least a first end of the computing device;
after the capturing is complete, present a plurality of media types to select from;
receive a selection of one of the media types; and
encode, in response to the received selection, one or more portions of the captured multimedia content item in accordance with the media-type selection to produce a corresponding encoded media object.

19. A computing device comprising:
one or more processors; and
a memory coupled to the processors comprising instructions executable by the processors, the processors being operable when executing the instructions to:
receive a user input, the user input representing a request to begin capturing a multimedia content item;
initiate, in response to the user input, the capturing of the multimedia content item;
terminate the capturing of the multimedia content item after detecting a motion of the computing device, the detected motion comprising a change in an original orientation of the computing device to a substantially orthogonal orientation or a flicking motion of at least a first end of the computing device;
after the capturing is complete, present a plurality of media types to select from;
receive a selection of one of the media types; and
encode, in response to the received selection, one or more portions of the captured multimedia content item in accordance with the media-type selection to produce a corresponding encoded media object.

20. The media of claim 18, wherein:
the computing device comprises a touch sensor; and
the user input comprises a tap or press applied to the touch sensor by a finger or stylus.

21. The media of claim 18, wherein:
the computing device comprises a motion sensor; and
the user input comprises another motion detected by the computing device.

22. The media of claim 21, wherein the motion sensor comprises a gyroscope or an accelerometer.

23. The media of claim 18, wherein the software is further operable when executed to capture one or more high-quality still images during the capturing of the multimedia content item.

24. The media of claim 18, wherein the multimedia content item comprises a digital video.

25. The media of claim 18, wherein the plurality of media types comprises video, still image, or a Graphics Interchange Format (GIF) image or animation.

26. The media of claim 18, wherein the software is further operable when executed to:
receive a selection of an image or a section of the captured multimedia content item; and
extract the selected image or section from the captured multimedia content item.

27. The media of claim 18, wherein the software is further operable when executed to perform facial recognition to identify one or more people who appear in the captured multimedia content item or in the encoded media object.

28. The media of claim 27, wherein the software is further operable when executed to display a suggestion to share the encoded media object with one or more of the identified people.

29. The media of claim 27, wherein the software is further operable when executed to display a suggestion to create an association between the encoded media object and one or more of the identified people.

30. The media of claim 18, wherein the software is further operable when executed to perform image analysis to identify one or more entities appearing in the captured multimedia content item or in the encoded media object.

31. The media of claim 30, wherein the software is further operable when executed to display a suggestion to create an association between the encoded media object and the identified entities.

32. The media of claim 18, wherein the software is further operable when executed to:
   detect a location of the computing device during the capturing of the multimedia content item; and
   display a suggestion to tag the encoded media object with the location.

33. The media of claim 18, wherein the software is further operable when executed to:
   predict the selected media type; and
   during the capturing of the multimedia content item, adjust one or more capturing parameters based on the predicted media type.

34. The media of claim 33, wherein the predicting the selected media type is based at least in part on historical information associated with one or more previously captured multimedia content items, user preferences, one or more properties of the captured multimedia content item, or status information associated with the computing device.

35. The media of claim 18, wherein the software is further operable when executed to, after the capturing of the video is terminated, present one or more portions of the captured multimedia content item as suggested portions to be encoded.

36. The computing device of claim 19, wherein:
   the computing device comprises a touch sensor; and
   the user input comprises a tap or press applied to the touch sensor by a finger or stylus.

37. The computing device of claim 19, wherein:
   the computing device comprises a motion sensor; and
   the user input comprises another motion detected by the computing device.

38. The computing device of claim 37, wherein the motion sensor comprises a gyroscope or an accelerometer.

39. The computing device of claim 19, wherein the processors are further operable when executing the instructions to capture one or more high-quality still images during the capturing of the multimedia content item.

40. The computing device of claim 19, wherein the multimedia content item comprises a digital video.

41. The computing device of claim 19, wherein the plurality of media types comprises video, still image, or a Graphics Interchange Format (GIF) image or animation.

42. The computing device of claim 19, wherein the processors are further operable when executing the instructions to:
   receive a selection of an image or a section of the captured multimedia content item; and
   extract the selected image or section from the captured multimedia content item.

43. The computing device of claim 19, wherein the processors are further operable when executing the instructions to perform facial recognition to identify one or more people who appear in the captured multimedia content item or in the encoded media object.

44. The computing device of claim 43, wherein the processors are further operable when executing the instructions to display a suggestion to share the encoded media object with one or more of the identified people.

45. The computing device of claim 43, wherein the processors are further operable when executing the instructions to display a suggestion to create an association between the encoded media object and one or more of the identified people.

46. The computing device of claim 19, wherein the processors are further operable when executing the instructions to perform image analysis to identify one or more entities appearing in the captured multimedia content item or in the encoded media object.

47. The computing device of claim 46, wherein the processors are further operable when executing the instructions to display a suggestion to create an association between the encoded media object and the identified entities.

48. The computing device of claim 19, wherein the processors are further operable when executing the instructions to
   detect a location of the computing device during the capturing of the multimedia content item; and
   display a suggestion to tag the encoded media object with the location.

49. The computing device of claim 19, wherein the processors are further operable when executing the instructions to
   predict the selected media type; and
   during the capturing of the multimedia content item, adjust one or more capturing parameters based on the predicted media type.

50. The computing device of claim 49, wherein the predicting the selected media type is based at least in part on historical information associated with one or more previously captured multimedia content items, user preferences, one or more properties of the captured multimedia content item, or status information associated with the computing device.

51. The computing device of claim 19, wherein the processors are further operable when executing the instructions to, after the capturing of the video is terminated, present one or more portions of the captured multimedia content item as suggested portions to be encoded.

* * * * *